United States Patent Office 3,096,327
Patented July 2, 1963

1

3,096,327
FLUORINATED PYRAZOLE STEROID
COMPOUNDS
Marcel Harnik, Morristown, Tenn., assignor to Chemetron
Corporation, Chicago, Ill., a corporation of Delaware
No Drawing. Filed Dec. 26, 1961, Ser. No. 162,230
4 Claims. (Cl. 260—239.5)

This invention relates to fluorinated steroid pyrazoles wherein the pyrazole ring is fused to the fluorinated steroid compound at the 2,3-position or the 20,21-position and to the production thereof. More particularly, it relates to fluorinated steroid pyrazole compounds of the general formulas

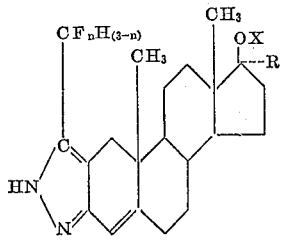

and

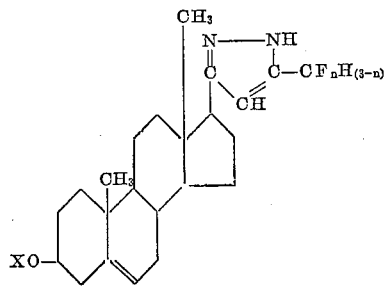

wherein X is hydrogen or acyl, R is hydrogen or a lower alkyl radical and $n$ is a positive integer from 1 to 3, inclusive.

The compounds of this invention have adrenocortical activity and are useful in the relief of inflammation of rheumatoid arthritis and similar collagen and allergic conditions, without undesirable androgenic, antiandrogenic or antiestrogenic effects. They have pharmaceutical utility in inducing thymolytic corticoid activity in mammals and can be applied orally, topically or parenterally in aqueous suspensions or in innocuous organic solvents. They are thus useful in supplementing the cortical hormone production of mammals without the side effects of the androgenic hormones. They also exhibit a high degree of anabolic activity without masculinizing side effects. These compounds are also useful as intermediates in the synthesis of adrenocorticoid compounds.

In the compounds of the foregoing formula, R can represent hydrogen or lower alkyl radicals, such as methyl, ethyl, propyl, isopropyl or butyl radicals, and X can represent hydrogen or lower alkanoyl radicals such as formyl, acetyl, propionyl or butyryl radicals.

It is an object of this invention to provide new steroid pyrazole compounds which have useful physiological activity. It is a further object to provide efficient methods for producing such compounds from available steroids. Another object is to provide steroid pyrazole compounds having fluorinated radicals in the pyrazole ring which are useful as adrenocorticoids. These and other objects are apparent from and are achieved in accordance with the following disclosure.

The compounds of this invention are produced from the corresponding fluorinated steroid β-diketones by reaction with hydrazine, the hydrazine reacting with the two β-keto groups to form a heterocyclic ring composed

2 of the two nitrogen atoms of the hydrazine and the three carbon atoms of the β-keto moiety of the fluorinated steroid. The fluorinated steroid β-diketones are produced from keto steroids by condensation with ethyl trifluoroacetate, ethyl difluoroacetate or similar lower alkyl esters of a fluorinated lower alkanoic acid, as described in my copending applications Serial Nos. 127,776; 122,093; 123,630; and 131,728. The fluorinated alkyl radical which is adjacent to one of the steroid keto groups forms a fluoroalkyl side chain on the pyrazole ring. The reaction of the fluorinated steroid β-diketone with hydrazine to form the pyrazole ring can conveniently be conducted at temperatures in the range of 50–150° C. in a solvent such as acetic acid, pyridine, ethanol, dioxane and the like. The steroid pyrazole compound that is produced can be isolated by evaporation of the solvent or dilution of the solvent with water and the solid steroid pyrazole compound so obtained can be purified by recrystallization from an organic solvent.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed.

Example 1

5 - trifluoromethyl - (17β - acetoxy - 4 - androsteno)-[3,2-c]-pyrazole

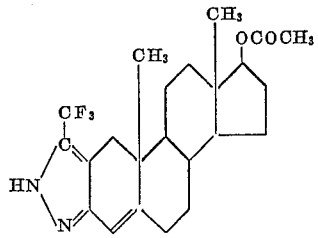

A solution of 2 grams of 2-trifluoroacetyl-4-androstene-17β-ol-3-one acetate (Harnik Serial No. 122,093) and 5 ml. of hydrazine in 100 ml. of acetic acid was heated for 2 hours on a steam bath, then diluted with water. The precipitate of 5-trifluoromethyl-(17β-acetoxy-4-androsteno)[3,2-c]-pyrazole was removed by filtration, dried and recrystallized from methanol. The product, which is a solvate, melts in the range of 122–132° C. (with decomposition). Its I.R. absorption curve in KBr has maxima at 5.74 and 5.81 microns.

This product also exists in an isomeric form with M.P. 122° C. (decomp.) and maxima in the I.R. absorption spectrum (in KBr) at 3.10 and 5.71 microns.

Example 2

5 - trifluoromethyl - (17α - methyl - 17β - acetoxy-4-androsteno) [3,2-c]-pyrazole

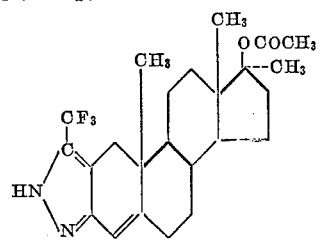

A solution of 10 grams of 2-(2,2,2-trifluoro-1-hydroxyethylidene)-17α-methyl-3,5-androstadiene-3,17β-diol triacetate (Harnik Serial No. 122,093) and 20 ml. of hydrazine in 150 ml. of acetic acid was heated on a steam bath for 2 hours, allowed to stand at 20–25° C. for 15 hours, and then diluted with water. The precipitate of 5-trifluoromethyl-(17α-methyl - 17β - acetoxy-4-androsteno)[3,2-c]-pyrazole was separated and dried; M.P. 167–170° C. The I.R. absorption spectrum (in KBr) has maxima at 2.86, 3.05, 5.81, 6.00, 6.11 and 6.27 microns.

*Example 3*

3 - (3 - acetoxy - 5 - androsten-17-yl)-5-difluoromethylpyrazole

A mixture of 2.57 grams of 21-difluoroacetyl-5-pregnene-3β-ol-20-one (Harnik Serial No. 127,776) and 4 ml. of hydrazine in 50 ml. of acetic acid was heated on a steam bath for 1.5 hours. The insoluble 3-(3-acetoxy-5-androsten-17-yl)-5-difluoromethylpyrazole was collected by filtration, washed with water and dried in a vacuum oven at 65° C.; yield, 2.34 grams; M.P. 176–190° C. Recrystallization from methanol gave M.P. 183–189° C. The I.R. absorption spectrum (KBr) has maxima at 2.88, 5.76, 5.83 and 6.31 microns.

I claim:
1. A fluorinated steroid pyrazole compound selected from the group consisting of

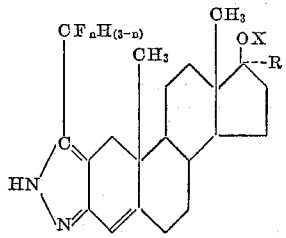

and

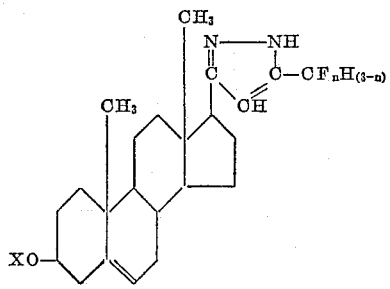

wherein X is selected from the group consisting of hydrogen and lower alkanoyl radicals, R is selected from the group consisting of hydrogen and lower alkyl radicals and $n$ is a positive integer from 1 to 3, inclusive.

2. 5 - trifluoromethyl - (17β-acetoxy-4-androsteno)-[3, 2-c]pyrazole.

3. 5 - trifluoromethyl - (17α-methyl-17β-acetoxy-4-androsteno)-[3,2-c]pyrazole.

4. 3 - (3 - acetoxy-5-androsten-17-yl)-5-difluoromethylpyrazole.

References Cited in the file of this patent
UNITED STATES PATENTS
2,945,852    Bergstrom _____ July 19, 1960